United States Patent
Matsumoto et al.

(10) Patent No.: US 6,960,010 B2
(45) Date of Patent: Nov. 1, 2005

(54) POLARIZED LIGHT EMITTING DEVICE FOR ILLUMINATING A DISPLAY

(75) Inventors: Kenji Matsumoto, Tokyo (JP); Junji Miyashita, Yamanashi-ken (JP)

(73) Assignees: Citizen Watch Co., Ltd., Tokyo (JP); Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/397,213

(22) Filed: Mar. 27, 2003

(65) Prior Publication Data

US 2003/0184989 A1 Oct. 2, 2003

(30) Foreign Application Priority Data

Mar. 29, 2002 (JP) .............................. 2002-097876

(51) Int. Cl.[7] .............................................. F21V 7/04
(52) U.S. Cl. .................. 362/609; 362/19; 362/560; 362/626; 349/67; 349/96
(58) Field of Search .............................. 362/19, 23, 26, 362/29, 31, 551, 558, 559, 560, 561, 257, 362/296, 307, 308, 317, 326, 327, 330, 341, 362/800, 609, 626, 600, 608, 610, 615, 623, 362/625; 349/1, 5, 8, 9, 56, 84, 96, 67; 353/20, 353/22, 23; 359/483, 485, 487, 488; 372/27, 372/92, 97, 106

(56) References Cited

U.S. PATENT DOCUMENTS

| | | | | |
|---|---|---|---|---|
| 4,737,896 A | * | 4/1988 | Mochizuki et al. | 362/301 |
| 4,798,448 A | * | 1/1989 | van Raalte | 349/62 |
| 5,359,691 A | * | 10/1994 | Tai et al. | 385/146 |
| 5,390,276 A | * | 2/1995 | Tai et al. | 385/146 |
| 5,587,816 A | * | 12/1996 | Gunjima et al. | 349/96 |
| 5,856,855 A | * | 1/1999 | Mol et al. | 362/31 |
| 6,082,861 A | * | 7/2000 | Dove et al. | 353/20 |
| 6,443,585 B1 | * | 9/2002 | Saccomanno | 362/19 |
| 6,515,785 B1 | * | 2/2003 | Cobb et al. | 362/561 |

* cited by examiner

Primary Examiner—John Anthony Ward
Assistant Examiner—Ismael Negron
(74) Attorney, Agent, or Firm—Dennison, Schultz, Dougherty & MacDonald

(57) ABSTRACT

A lighting device has a light source for emitting lighting light for illuminating a display, and a light guide plate for changing the direction of the lighting light to the display. A polarization separation film is provided for separating polarization of the lighting light into P-polarized light and S-polarized light for illuminating the display.

6 Claims, 3 Drawing Sheets

POLARIZED LIGHT EMITTING DEVICE FOR ILLUMINATING A DISPLAY

BACKGROUND OF THE INVENTION

The present invention relates to a lighting device for lighting a liquid crystal display (LCD).

A color LCD is used in a portable electronic device such as a portable telephone in recent years. A lighting device for such a color LCD comprises, for example a light source (LED), a lighting panel for applying light from the LED to the color LCD. The light source for the color LCD is required to have high luminance and a low consumption power in order to elongate the life of a battery for the light source.

In a conventional lighting device, a polarization filter is disposed between the lighting device and the LCD in order to absorb unnecessary polarization components. As a result, considerable quantity of light is uselessly absorbed.

Japanese Patent Application Laid Open 11-96819 discloses a lighting device which may satisfy such abhorrent requirements. The lighting device comprises a light source, a lighting panel having an incident surface corresponding to the light source, a lower reflection surface, an upper discharge surface, and a reflection plate disposed below the lighting panel. In the lighting device, there is further provided a polarization dividing plate, a polarized light beam splitter, and others. Thus, the device is complicated in construction because of a large number of parts, which causes the manufacturing cost to increase.

SUMMARY OF THE INVENTION

An object of the present invention is to provide a lighting device which may be simple in construction and manufactured at a low cost.

According to the present invention, there is provided a lighting device comprising a light source for emitting lighting light for illuminating a display, a light guide plate for changing the direction of the lighting light to the display, a polarization separation film for separating polarization of the lighting light into linearly polarized light for illuminating the display.

The lighting device further comprises at least one polarization direction changing film for changing the polarization of transmitting light into random polarization.

A microprism having a plurality of scalene prisms for reflecting light so as to reduce an incident angle on a surface of the device.

The polarization separation film is provided for separating polarization of the lighting light into P-polarized light and S-polarized light.

These and other objects and features of the present invention will become more apparent from the following detailed description with reference to the accompanying drawings.

DETAILED DESCRIPTION OF THE PREFERRED EMBODIMENT

Figure 1:
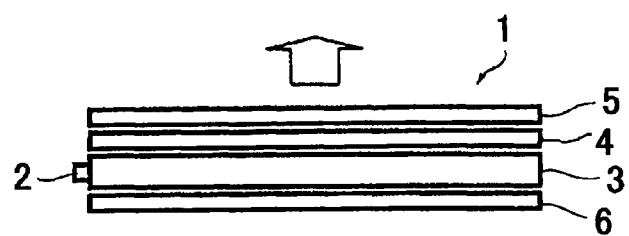
FIG. 1 is a side view showing a side view of a generally used lighting device structure, just a reference for the present invention.
Figure 2:
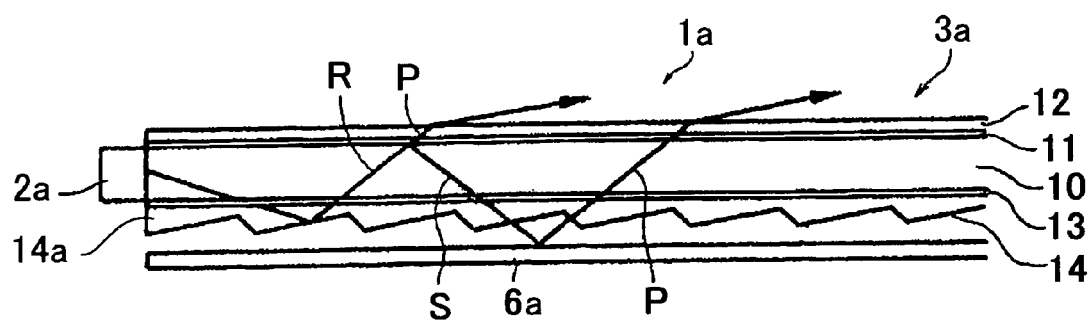
FIG. 2 is a side view of a lighting device according to a first embodiment of the present invention.

FIG. 1 is a side view showing a generally-used-lighting-device structure, just a reference for the present invention, and FIG. 2 is a side view of a lighting device according to a first embodiment of the present invention.

Referring to FIG. 1, a lighting device 1 comprises an LED 2 as a light source, a light guide plate 3 corresponding to the LED 2, a prism sheet 4 disposed above the light guide plate 3 for arranging the light discharged from an upper discharge surface of the light guide plate 3, a diffusion sheet 5, and a reflection plate 6 disposed under the light guide plate 3. Light is discharged from the diffusion sheet 5 in the direction shown by the arrow so as to illuminate the LCD (not shown).

The present invention is to improve the light guide plate 3. Light discharged from the upper surface of the light guide plate 3 is separated to split P-polarization components and S-polarization components, and one of the P-polarization components and S-polarization components is used for illuminating and at the same time, the other components are reflected in the light guide plate and the polarizing-direction of the other components is modified, and the other components are efficiently used for illuminating in the end. Referring to FIG. 2, a lighting device 1a includes a light source such as an LED 2a, light guide plate 3a which is disposed to receive a light emitted from the light source at an end face of the light guide plate, and the light guide plate having a reflector 14a formed on either of a front or a bottom face thereof. The light guide plate 3a comprises a light guide body 10, a polarization split film 11 which is disposed on a front surface of the light guide body 10, a polarizing-direction modifier 13 which is disposed on a bottom surface of the light guide body 10, a cover 12 which is disposed on the polarization split film 11, and the reflector 14a which comprises prisms 14 disposed on the polarizing-direction modifier 13. Each of the prisms 14 may have the same vertex. Also, the prisms 14 may have different vertex. In the light guide plate 3a the polarization split film 11 separates an upper part and lower part of the light guide plate 3a. The upper part comprises the cover 12, and the lower part comprises the light guide body 10, the polarizing-direction modifier 13, and the prisms 14. The polarization split film 11, the cover 12, the polarizing-direction modifier 13 which is disposed in the lower part of the light guide plate 3a and the prisms 14 are formed integral to be the light guide plate 3a as a reflector. Also, under the prisms 14 which form the lowest part of the light guide plate 3a a reflection plate 6a may be disposed to reflect an effectively transmitting light from the prisms 14 into the light guide plate 3a. Here, the polarizing-direction modifier 13 may be disposed on the reflection plate 6a. That means the polarizing-direction modifier 13 is not necessarily formed integral with the light guide plate 3a.

Figure 5:
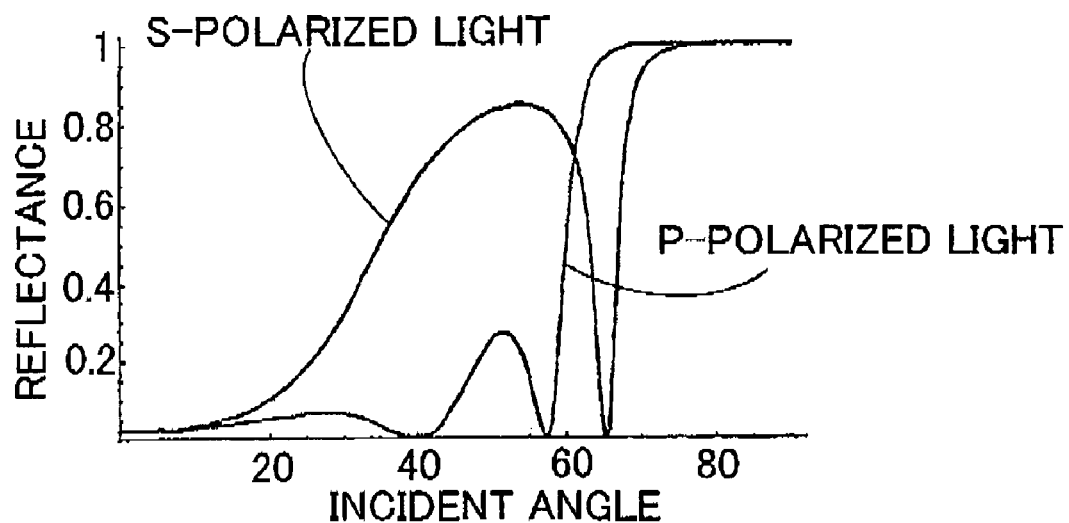
FIG. 5 is a graph showing reflectances of a three-layer polarization separation film which is made so as to increase the reflectance of S-polarized light.
Figure 6:
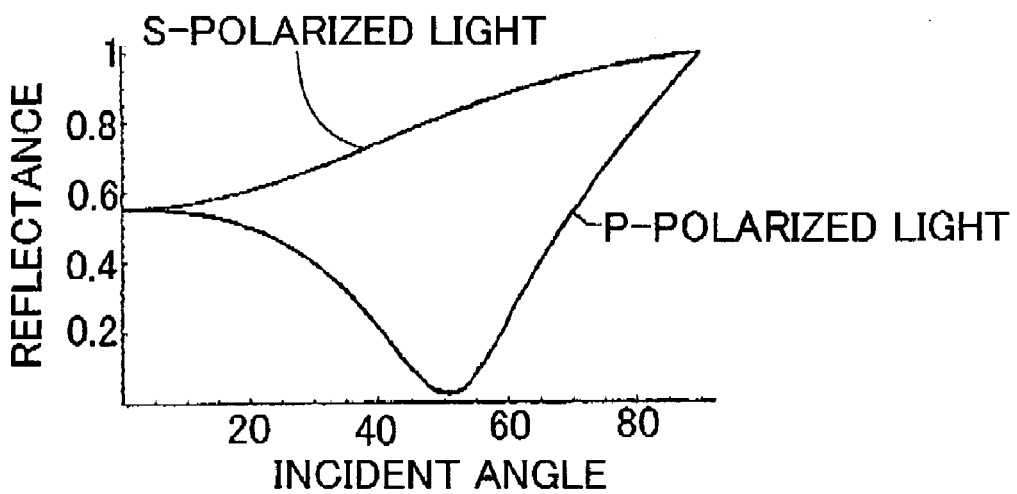
FIG. 6 is a graph showing reflectances of a polarization separation film made by surface plasmon.

The polarization split film 11 transmits only light P of the P-polarization light in the random polarization lights R emitted from the LED 2a, and light P is parallel to the incident surface, and also the polarization split film 11 reflects light S of S-polarization light, which is perpendicular to the incident surface. The polarization split film 11 is a three-layer film comprising a central layer of MgO having a refractive index of 1.75 and thickness of 95.6 nm and a pair of outer layers each of which is a film of $CaF_2$ having a refractive index of 1.24 and thickness of 186 nm, in the case of Brewster angle of 40 degrees. In the case of the three-layer film, as shown in FIG. 5, since the incident angle is approximately between 36° and 40°, it is possible to separate the P-polarization light and S-polarization light.

The polarizing-direction modifier 13 which is a quarter-wave plate or a diffusion filter which has a slight refractivity is provided for changing polarization direction of light, making a difference of a quarter wavelength λ in optical thickness between crossing polarization components.

The cover 12 disposed on the polarization split film 11 is formed by the material for protecting the polarization split film 11. It is preferable to use the same material as the light guide body 10.

In the light guide plate 3a only light P of P-polarization in the light R of random polarization emitted from the LED 2a transmits the polarization split film 11, and the light S of S-polarization is reflected. When the incident angle of the light P to the upper surface of the cover 12 is smaller than the critical angle, the light discharges from the cover. The light S of S-polarization light transmits the polarizing-direction modifier 13 when the polarizing-direction modifier 13 is a quarter-wave plate so that the phase difference between crossing polarization components becomes π/2, thereby becoming circular polarization light. The incident angle of the circular polarization light to the prisms 14 becomes larger than the critical angle, the light transmits the prisms 14 as shown in FIG. 2 and is reflected by the reflection plate 6a. By transmitting the polarizing-direction modifier 13, the direction of the polarization plane of the light S is rotated 90 degrees and becomes light P of P-polarization component. The direction modified light S which becomes light P now transmit the light guide plate 3a to illuminate the LCD.

If the incident angle of the light S which is reflected on the polarization split film 1 to the prisms 14 is larger than the critical angle, the light S is totally reflected on the prisms 14 to be returned to the light guide body 10. However, since the prisms 14 have a stepwise surface, the angle of reflected light changes at every reflection on the prisms 14, so that the incident angle to the light guide plate 3a reduces to be discharged from the upper surface of the light guide plate 3a. Since the light S reflected on the prisms 14 passes through the polarizing-direction modifier 13 two times, the light S changes to light P which discharges from the upper surface of the light guide plate 3a.

When prisms 14 having a pitch of 0.3 mm and height of 0.01 mm is used, the inclination angle of the inclined surface of the prisms 14 is about 2° and the incident angle with respect to the normal of the upper surface of the light guide plate 3a reduces by about 40 at every reflection. Therefore, the light smaller than the critical angle is discharged from the upper surface of the light guide plate 3a.

When polycarbonate of refractive index of 1.55 is used as the light guide body 10, the critical angle between the light guide body and air becomes about 40°, light at incident angle smaller than 40° is discharged from the upper surface of the light guide plate 3a, and light of incident angle larger than about 40° is reflected on the upper surface of the light guide plate 3a. Since the incident angle on the light guide plate 3a when reflected on the prisms 14 is reduced by about 4° incident angle to the upper surface of the light guide plate 3a of the next discharged light becomes about 36° to 40°. As shown in FIG. 5, when the incident angle is about 36° to 40°, the light P transmits without reflecting. Since 60 to 70% of the light S reflects, it is possible to separate the light P and light S.

In the embodiment, the upper surface of the light guide body 10 and the polarization split film 11 is parallel. Therefore, it is sufficient to consider separated light P and S as to the light of incident angles 36° to 40°. Since it is not necessary to consider the polarization split film for all incident angles, the polarization split film can be easily designed and manufactured. Consequently, as described above, it is possible to achieve the purpose by only three-layer films.

The polarization separation film 11 may be formed by three-layer film of surface plasmon. The polarization separation film 11 generates evanescent wave which excites the surface plasmon, thereby transmitting the light of P-polarization component and reflecting the light of S-polarization component.

Figure 3:
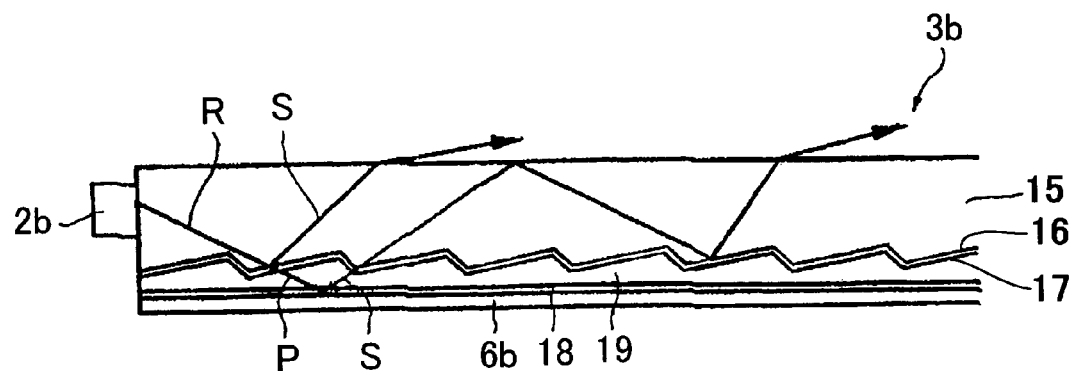
FIG. 3 is a side view of a second embodiment of the present invention.

FIG. 3 is a side view of a second embodiment of the present invention. A light guide plate 3b comprises a light guide body 15, prisms 16 formed on the lower surface of the light guide body 15, a polarization split film 17 formed on the underside of the prisms 16, an intermediate member 19 on the underside of the polarization split film 17, and a polarizing-direction modifier 18 formed on the underside of the intermediate member 19. Thus, the prisms 16, polarization split film 17, intermediate member 19, and polarizing-direction modifier 18 are integrated with the light guide body 15. Here, a reflection plate 6b is secured to the polarizing-direction modifier 18.

It is clear that the reflection plate 6b can be formed integral with the light guide plate 3b.

The light P of P-polarization component in the light R emitted from the light source such as an LED 2b transmits the polarization split film 17, and the light S of S-polarization component is reflected by the film 17. The light S reflected by the film 17 is discharged from the upper surface of light guide plate 3b. On the other hand, the light P which transmits the film 17 is reflected by the reflection plate 6b to be returned in the light guide body 15. Since the light P passes the polarizing-direction modifier 18 two times, the polarization plane is rotated 90°, so that the light P and the polarization plane thereof is modified to be light S of S-polarization component. The light S of incident angle smaller than the critical angle transmits the light guide body 15 for the illumination of the LCD. The light S of larger incident angle is repeatedly reflected by the upper surface of the light guide body 15 and the longer side of the prisms 16, which corresponds to the light source 2b so that the incident angle gradually reduces to a incident angle smaller than the critical angle, thereby discharging from the upper surface of the light guide plate 3b.

Since the reflectance of the light S of the S-polarization light is not so high as shown in FIG. 5, there is generated light passing through the polarization split film 17. However, this light is mixed with the light P and advances to pass through the polarizing-direction modifier 18, so that the polarization direction is changed and reflected again on the polarization split film 17 to be discharged from the light guide plate 3b or transmitted and enters the light guide plate 3b. Therefore, there is no loss of light. Further, it is possible to increase the reflectance of the light S by increasing the number of layers of polarization split film 17. Thus it is possible to increase the split ability of the light guide plate.

Figure 4:
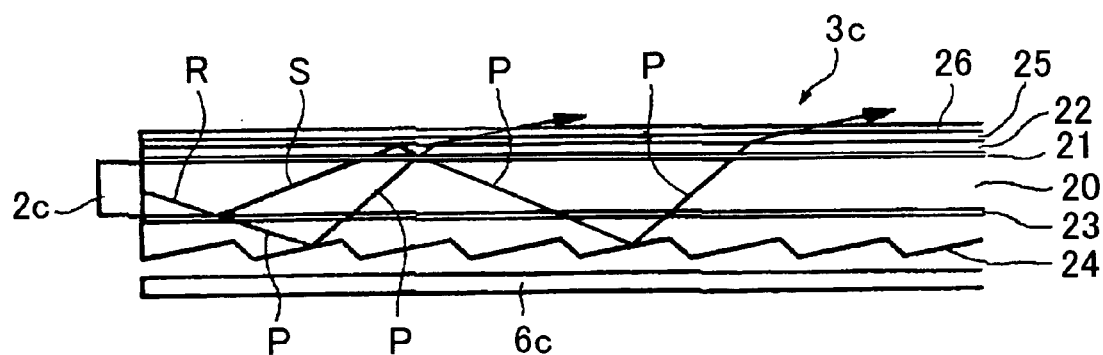
FIG. 4 is a side view of a third embodiment of the present invention.

FIG. 4 is a side view of a third embodiment of the present invention. A light guide plate 3c comprises a light guide body 20, a first polarizing-direction modifier 21 on the upper surface of the light guide body 20, a first cover 22 on the first polarizing-direction modifier 21, a second polarizing-direction modifier 25 on the first cover 22, a second cover 26 on the modifier 25, a polarization split film 23 on the underside of the light guide body 20, and prisms 24 on the underside of the polarization split film 23.

In the light guide plate 3c, the light R from the an LED 2c is separated to the light P and the light S by the polarization split film 23, the light P transmits the polarization split film 23, and the light S is reflected by the film. The reflected light S transmits the polarizing-direction modifier 21, thereby being changed to a circular polarization light. The circular polarization light is reflected by the upper surface of the first cover 22 because of large incident angle, and transmits the polarizing-direction modifier 21 to be changed to light P. The light P passes the polarization split film 23 and is reflected by the prisms 24 and passes the polarization split film 23 again. The light P passes the polarizing-direction modifier 21, thereby being changed to circular polarization light. The circular polarization light transmits the second cover 26.

On the other hand, the light P which fifst passes the polarization split film 23 is reflected by the prisms 24 and passes the polarization split film 23. The light P is changed to the circular polarization light by passing the polarizing-direction modifier 21. The circular polarization light is discharged from the upper surface of the light guide plate 3c. If the circular polarization light is reflected on the prisms 24, the light is reflected on the a reflection plate 6c to be returned to the light guide plate 3c and discharges from the upper surface.

The light discharged from the upper surface of the light guide plate 3c is the circular polarization light, the phase of which is rotated π/2 from that of the light P. The polarization direction is different from the direction necessary for the LCD panel.

In order to resolve the problem, there is provided the second polarizing-direction modifier 25 and the second cover 26 on the light guide plate 3c, so that the circular polarization light is changed to light S, or the circular polarization light is changed to light P by rotating the phase π/2 in the reverse direction.

Further, as the first cover 22 and second cover 26, the substrate having the polarizing-direction modifiers 21, 25 may be used as it is. In that case, it is desirable to use material the refractive index of which is nearly equal to that of the light guide body 20. If upper surfaces of the polarizing-direction modifiers 21, 25 can be protected by any means, the covers 22 and 26 can be omitted.

Here, the light guide bodies 15 and 20, the polarization split films 17 and 23, polarizing-direction modifiers 18, 21 and 25, and prisms 16 and 24 in the second and third embodiments have the same compositions as the light guide body 10, polarization split film 11, polarizing-direction modifier 13 and prism 14 in the first embodiment and have the same operations. Hence, particular descriptions thereof are omitted herein.

As described above, only the light P in the invention of the first embodiment, only the light S in the invention of the second embodiment, only the light P or light S in the invention of the third embodiment are upwardly projected from the upper surface of the light guide plate 3c. Therefore, the direction of light can be changed to the direction close to the vertical direction by the prism sheet 4, and the diffusion sheet 5 may be used as necessary. Thus, it is possible to illuminate the LCD panel by the linearly polarized light.

By coinciding the polarization axis of the polarization filter of the LCD panel with the polarization direction filter of the LCD panel with the polarization direction of the linearly polarized light, it is possible to obtain a high efficiency illuminating device for the LCD device in which there is scarcely light to be absorbed by the polarization filter. Since each of the light guide bodies 10, 15, 20, polarization split films 11, 17, 23, polarizing-direction modifiers 13, 18, 21, 25, prisms 13, 16, 24 are integrally formed, the construction is simple, and the number of parts is two, which is the same as the conventional device, and hence may be manufactured at a low cost and may be reduced in thickness.

In accordance with the present invention, a large quantity of light emitted from the light source is changed to linearly polarized light necessary to illuminate the LCD. Therefore, the light from the light source is effectively used without wasting electric power of the battery.

While the invention has been described in conjunction with preferred specific embodiment thereof, it will be understood that this description is intended to illustrate and not limit the scope of the invention, which is defined by the following claims.

What is claimed is:

1. A lighting device comprising:
 a light source;
 a light guide plate disposed to receive a light emitted from the light source at an end face of the light guide plate, and
 the light guide plate comprising a light guide body having a polarization direction modifier formed on a surface of the light guide body, and a polarization split film on the surface of the light guide body which transmits p-polarization components and reflects S-polarization components, wherein the polarization direction modifier and the polarization split film are integral with the light guide body, and a reflector for reflecting the light transmitting in the light guide plate, the reflector formed on the light guide body comprises a plurality of prisms.

2. The lighting device according to claim 1 wherein the polarization split film is positioned in the light guide plate to separate an upper part and a lower part of the light guide plate, and the reflector comprising prisms is formed on the bottom face of the light guide plate and the polarizing direction modifier is positioned in the light guide plate under the polarization split film and above the reflector in the light guide plate, and the light source is disposed to face the lower part of the light guide plate at the end face of the light guide plate.

3. The lighting device according to claim 1 wherein the polarization split film is positioned in the light guide plate to separate an upper part and a lower part of the light guide plate, and the polarization split film is positioned on the underside of the reflector comprising prisms and the polarizing direction modifier is positioned below the polarization split film integral with the reflector in the light guide plate and the light source is disposed to face the upper part of the light guide plate at the end face of the light guide plate.

4. The lighting device according to claim 1 wherein the polarization split film is positioned in the light guide plate to separate an upper part and a lower part of the light guide plate and the polarizing direction modifier is positioned in the upper part of the light guide plate and the reflector comprising prisms is formed on the lower part of the light guide plate and the light source is disposed to face the upper part of the light guide plate at the end face of the light guide plate.

5. The lighting device according to claim 2, 3, or 4 where the polarization direction modifier is a quarter-wave plate.

6. The lighting device according to claim 2, 3, or 4 where the polarization split film uses polarizing characteristics of surface plasmon.

* * * * *